3,211,743
AMINOPYRAZOLES
Paul Schmidt, Therwil, and Kurt Eichenberger and Max Wilhelm, Basel, Switzerland, assignors to Ciba Corporation, New York, N.Y., a corporation of Delaware
No Drawing. Filed July 12, 1963, Ser. No. 294,738
Claims priority, application Switzerland, July 16, 1962, 8,517/62; May 17, 1963, 6,276/63
14 Claims. (Cl. 260—310)

The present invention relates to new pyrazoles. More especially it concerns 1-hydroxyalkyl-pyrazoles containing attached in position 3 or 5 a free amino group and in position 4 a phenyl radical.

The phenyl radical in position 4 may be unsubstituted or it may contain one or several substituents, for example lower alkyl radicals such as methyl, ethyl, propyl or butyl groups, hydroxyl groups, lower alkoxy groups such as methoxy, ethoxy, propoxy or butoxy radicals, free or substituted amino groups, for example mono- or di-lower alkylamino groups such as dimethylamino or diethylamino groups, or acylamino groups, nitro groups or halogen atoms such as fluorine, chlorine, bromine or iodine, or the pseudohalogen trifluoromethyl.

The hydroxyalkyl radical in position 1 is above all a lower hydroxyalkyl radical in which the hydroxyl group is separated from the pyrazole nitrogen atom by 2 to 5 carbon atoms, being for instance a hydroxyethyl, hydroxypropyl, hydroxybutyl or hydroxypentyl radical. The free amino group is preferably in position 3.

The new compounds possess valuable pharmacological, especially spinal blocking properties; thus, for example, when tested on cats and rabbits they inhibit the transmission of the spinal reflexes of these animals. They are therefore useful, for example, as muscle relaxants. They are also suitable for use as intermediates for the manufacture of other valuable compounds.

Particular mention deserve compounds of the formula

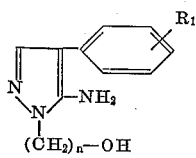

and especially compounds of the formula

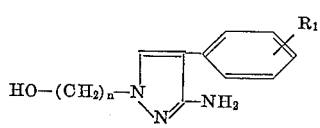

in which $R_1$ stands for hydrogen, halogen, lower alkoxy or lower alkyl and $n=2$ or 3.

Particularly effective is 1-($\beta$-hydroxyethyl)-3-amino-4-(para-chlorophenyl)-pyrazole.

The new compounds are prepared by known methods. Preferably, a $\beta$-oxo-alkanoic acid nitrile that contains a phenyl radical in position $\alpha$ is condensed with an N-hydroxyalkyl hydrazine which may be substituted at the N'-nitrogen atom by an acyl or methylidene radical, any acyl or methylidene radical present being eliminated by hydrolysis before or during the cyclization reaction. An acyl radical is for example a lower alkanoyl radical such as the acetyl group. A methylidene radical is for example an alkylidene or aralkylidene group, such as a benzylidene radical.

The condensation is performed in the usual manner, preferably in the presence of diluents or solvents, such as alcohols, toluene, chloroform or methylene chloride, in the presence or absence of condensing agents and/or catalysts, at room temperature or preferably at an elevated temperature, if desired under superatmospheric pressure and/or in an inert gas.

The hydrolysis of the acyl or methylidene radical at the N'-nitrogen atom of the hydroxyalkyl hydrazine is preferably performed with an acid, for example in an aqueous or better still in an alcoholic medium, for example in alcoholic hydrochloric acid. This treatment is accompanied by cyclization which furnishes the 1-hydroxyalkyl-3-amino-4-phenylpyrazole.

The reaction with an N'-unsubstituted N-hydroxyalkyl hydrazine leads as a rule to 1-hydroxyalkyl-3-amino derivatives and 1-hydroxyalkyl-5-amino derivatives. The two isomers can be separated from each other by conventional methods, for example by chromatography and/or fractional crystallization.

The starting materials are known or, insofar as they are new, they are accessible by known methods.

There are advantageously used those starting materials which lead to the formation of the final products mentioned above as being especially valuable.

The invention includes also any variant of the process in which an intermediate obtainable at any stage thereof is used as starting material and any remaining step or steps is/are carried out or the process is discontinued at any stage thereof, or in which a starting material is formed under the reaction conditions.

The new compounds may be used as medicaments, for example in the form of pharmaceutical preparations which contain them in admixture or conjunction with an organic or inorganic, solid or liquid excipient suitable for enteral, parenteral or local administration. Suitable excipients are substances that do not react with the new compounds, such, for example, as water, gelatine, lactose, starches, magnesium stearate, talcum, vegetable oils, benzyl alcohols, gums, polyalkylene glycols, white petroleum jelly, cholesterol or other known medicinal excipients. The pharmaceutical preparations may be, for example, tablets, dragees, ointments or creams, or in liquid form solutions, suspensions or emulsions. They may be sterilized and/or may contain assistants such as preserving, stabilizing, wetting or emulsifying agents, salts for regulating the osmotic pressure or buffers. They may also contain other therapeutically valuable substances. The preparations are formulated by known methods.

The new compounds may also be used in veterinary medicine, for example in one of the above-mentioned forms or in the form of additives to animal fodder with the use, for example, of the conventional extenders and diluents or fodders respectively.

The following examples illustrate the invention without, however, restricting its scope thereto.

*Example 1*

14.5 g. of $\alpha$-formyl-benzylcyanide are slowly stirred at 60° C. into a mixture of 12.4 g. of $\beta$-hydroxyethyl hydrazine in 13 ml. of glacial acetic acid and 80 ml. of benzene, and the whole is then refluxed for 3 hours with the use of a water separator. After cooling, the batch is twice extracted with dilute hydrochloric acid and the aqueous acid solution is adjusted with concentrated sodium hydroxide solution to pH=9, whereupon crystals separate out. 13.5 g. of this crystalline mixture are agitated for 30 minutes with 130 ml. of methylene chloride.

The insoluble phase is 1-(β-hydroxyethyl)-5-amino-4-phenylpyrazole of the formula

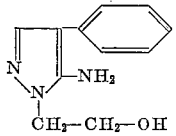

which melts at 128–130° C. after recrystallization from alcohol.

The methylene chloride filtrate is evaporated to dryness and the residue is recrystallized from alcohol, to yield 1-(β-hydroxyethyl)-3-amino-4-phenylpyrazole of the formula

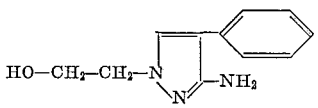

melting at 87–90° C.

*Example 2*

A mixture of 32 g. of α-formyl-para-chlorobenzyl cyanide, 15.6 g. of β-hydroxyethyl hydrazine and 180 ml. of absolute alcohol is refluxed for 10 hours, then evaporated to dryness and the residue is recrystallized from alcohol. 23 g. of the resulting crystalline mixture are agitated for 30 minutes at room temperature with 300 ml. of methylene chloride. The insoluble share is 1-(β-hydroxyethyl)-5-amino-4 - (para-chlorophenyl)-pyrazole of the formula

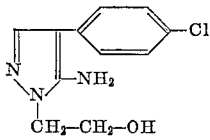

melting at 136–138° C. After one recrystallization from alcohol its melting point rises to 138–139° C.

The methylene chloride filtrate is evaporated to dryness, and the residue is recrystallized from alcohol, to yield 1-(β-hydroxyethyl)-3-amino-4-(para-chlorophenyl)-pyrazole of the formula

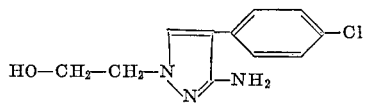

melting at 110–111° C.

*Example 3*

A solution of 18 g. of α-formyl-para-chlorobenzyl-cyanide in 30 ml. of absolute alcohol is added dropwise to 16.4 g. of N-(β-hydroxyethyl)-N′-benzylidene hydrazine in 300 ml. of absolute benzene and the whole is refluxed for 4 hours, evaporated to dryness, and the residue is mixed with ether, whereupon β-[N′-benzylidene-N-(β-hydroxyethyl) - hydrazino]-α - (para - chlorophenyl)-acrylonitrile of the formula

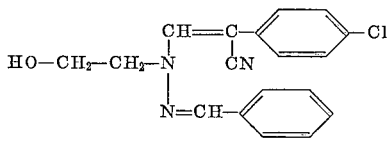

settles out in fine yellowish crystals melting at 161–164° C.

6.5 g. of the above product in 35 ml. of boiling alcohol are mixed with 5.2 ml. of concentrated hydrochloric acid and refluxed for 30 minutes. The solvent is then evaporated under vacuum and the residue is boiled with ether. The ether-insoluble share is mixed with 2 N-sodium hydroxide solution and extracted with chloroform. The chloroform residue yields on trituration with ether the 1-(β-hydroxyethyl)-3-amino - 4-(para-chlorophenyl)-pyrazole (melting at 110–111° C.) described in Example 2.

What is claimed is:

1. A compound of the formula

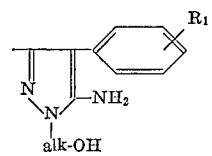

in which $R_1$ stands for a member selected from the group consisting of hydrogen, lower alkyl, hydroxyl, lower alkoxy, amino, mono-lower alkylamino, di-lower alkylamino, lower alkanoylamino, benzoylamino, nitro, halogen and trifluoromethyl and alk for lower alkylene.

2. A compound of the formula

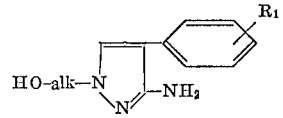

in which $R_1$ stands for a member selected from the group consisting of hydrogen, lower alkyl, hydroxyl, lower alkoxy, amino, mono-lower alkylamino, di-lower alkylamino, lower alkanoylamino, benzoylamino, nitro, halogen and trifluoromethyl and alk for lower alkylene.

3. A compound of the formula

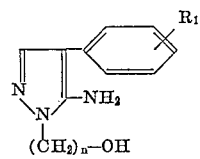

in which $R_1$ represents hydrogen and $n$ stands for one of the numbers 2 and 3.

4. A compound of the formula

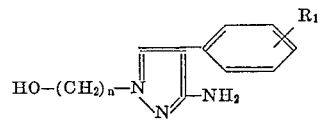

in which $R_1$ represents hydrogen and $n$ stands for one of the numbers 2 and 3.

5. A compound of the formula

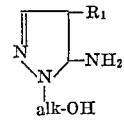

in which $R_1$ represents halogenophenyl and alk stands for lower alkylene.

6. A compound of the formula

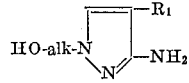

in which $R_1$ represents halogenophenyl and alk stands for lower alkylene.

7. 1-(β-hydroxy-ethyl)-3-amino-4-phenylpyrazole.

8. 1-(β-hydroxy-ethyl)-3-amino-4 - (parachlorophenyl)-pyrazole.

9. 1-(β-hydroxy-ethyl)-5-amino-4-phenylpyrazole.

10. 1-(β-hydroxy-ethyl)-5-amino-4-(parachlorophenyl)-pyrazole.

11. A compound of the formula

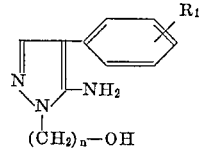

in which $R_1$ represents lower alkoxy, and $n$ stands for one of the numbers 2 and 3.

12. A compound of the formula

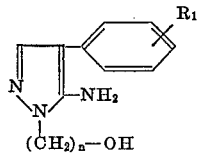

in which $R_1$ represents lower alkyl, and $n$ stands for one of the numbers 2 and 3.

13. A compound of the formula

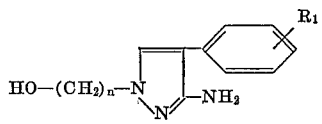

in which $R_1$ represents lower alkoxy, and $n$ stands for one of the numbers 2 and 3.

14. A compound of the formula

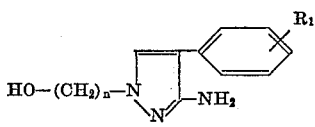

in which $R_1$ represents lower alkyl, and $n$ stands for one of the numbers 2 and 3.

References Cited by the Examiner

UNITED STATES PATENTS 2,989,539  6/61  Anderson et al. _____ 260—310

FOREIGN PATENTS 571,028  9/58  Belgium.

OTHER REFERENCES

Chemical Abstracts, vol. 56, Subject Index, I–Z, page 1866s (January–June 1962).

Kurtz et al.: Liebig's Annalen der Chemie, vol. 624, pages 8–9 and 19–21 (1959).

WALTER A. MODANCE, *Primary Examiner.*

NICHOLAS S. RIZZO, *Examiner.*

UNITED STATES PATENT OFFICE
CERTIFICATE OF CORRECTION

Patent No. 3,211,743                            October 12, 1965

Paul Schmidt et al.

It is hereby certified that error appears in the above numbered patent requiring correction and that the said Letters Patent should read as corrected below.

Column 4, lines 39 to 43, the formula should appear as shown below instead of as in the patent:

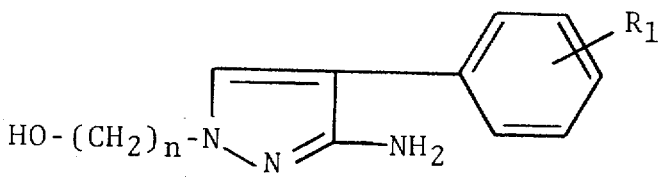

same column 4, lines 47 to 51, the formula should appear as shown below instead of as in the patent:

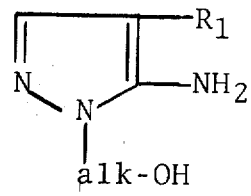

same column 4, lines 62 and 65, for "-phenylpyrazole", each occurrence, read ---phenyl-pyrazole --; same column 4, lines 63 and 66, for "-(parachlorophenyl)", each occurrence, read -- -(para-chlorophenyl) --.

Signed and sealed this 9th day of August 1966.

(SEAL)
Attest:

ERNEST W. SWIDER
Attesting Officer

EDWARD J. BRENNER
                                     Commissioner of Patents